Dec. 29, 1936. L. HERBERT ET AL 2,065,971
MANUFACTURE OF PNEUMATIC TIRES
Filed Feb. 12, 1935    2 Sheets-Sheet 2
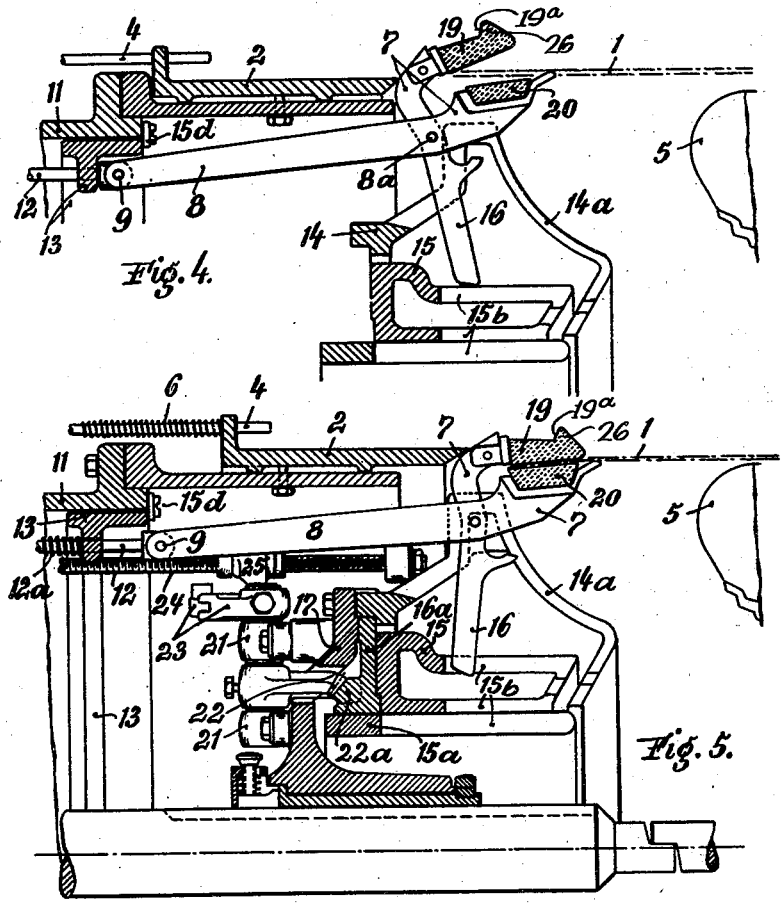
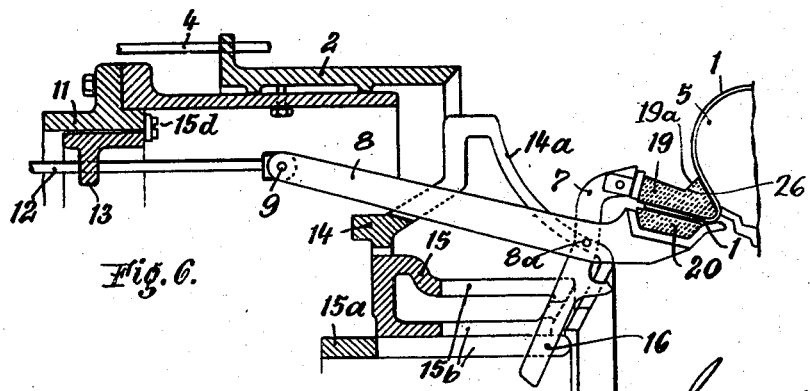
Inventors:
Leonhard Herbert
Adolf Fröhlich
By Shanks. Appleman, Atty.

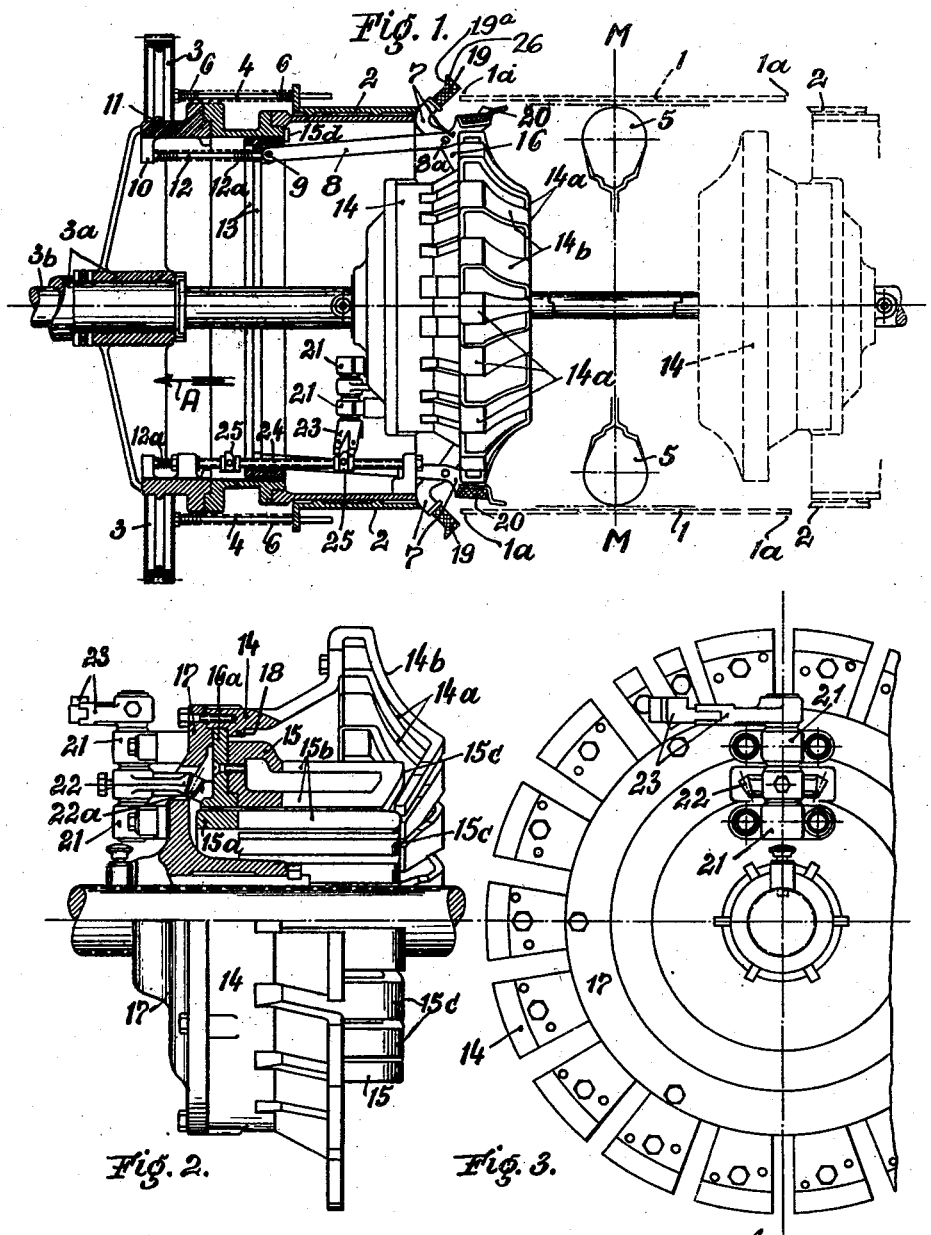

Patented Dec. 29, 1936

2,065,971

UNITED STATES PATENT OFFICE 2,065,971

MANUFACTURE OF PNEUMATIC TIRES

Leonhard Herbert, Frankfort-on-the-Main, and Adolf Fröhlich, Hannover, Germany

Application February 12, 1935, Serial No. 6,250

6 Claims. (Cl. 154—10)

This invention relates to a device for producing pneumatic tires, preferably for motor vehicles.

In the manufacture of cord tires, the frame was hitherto built up on a round core, a flat drum, a shouldered drum or on a core curved to suit requirements. When a round core was used, the cord was applied to the core as an endless band and in a single or double layer with a certain amount of tension, either by hand with the aid of a suitable tool of hardwood, hard rubber, bone, etc. so as to face the flange, or it was rolled down mechanically by means of flat rollers.

If flat or shouldered drums were used, the layers were extended around on the revolving drums and the finished structure was transversely curved after removal from the drum or before the insertion of the heating coil.

When, under such old methods, a tire has been worked and finished to the extent mentioned, the heating coil or tube was inserted therein and necessarily subjected to severe strain by bending and pulling.

These manufacturing methods are open to the objection that the thread spacings and the tensioning in the cord layers become uneven during working whereby the carrying capacity of the structure is decreased.

The present invention eliminates these drawbacks by providing a method and device for combining the hitherto separated mechanical and manual operations into one mechanical process and thus reducing unreliability due to hand work to a minimum.

Compared with heretofore existing methods and devices, the purely mechanical process of building up the tire from the layers of cord affords the advantage that the layers do not flap while they are placed around the core and the structure of the cord fabric is thus not distorted or displaced. Furthermore, the tire is built directly upon the heating tube which is subsequently inserted and during insertion subjected to sharp bending and pulling, so that, by the present arrangement, the life thereof will be increased.

In the machine according to the invention for carrying out the new process two axially displaceable drums of equal size are provided, one at each side of the core which is also the vulcanizing element, on which the layers of cord are arranged in known manner. The two drums are then withdrawn towards the sides and the endless cord band is simultaneously gripped at both edges by tongs disposed at the adjacent edges of the drums, each of the tongs being carried and operated by a lever system. The equidistantly gripped cord band is then placed by one movement at a certain tension around the round core serving also as a vulcanizing unit by means of the guide curves of a slotted annular basketlike lever guide cooperating with the lever systems.

By way of example, one form of a device according to the invention is illustrated in the accompanying drawings, in which Figure 1 is a longitudinal section of the device with the basketlike tongs guide in elevation; Fig. 2 is a longitudinal section partly in elevation of the basketlike guide on a larger scale showing the slotted and rotatably disposed guide ring for the lever arms; Fig. 3 is a side view of Fig. 2 seen from the left; Figs. 4, 5, and 6 are detail views of the three main working positions of the gripper tongs for engaging the edges of the cord band; and the line M—M in Fig. 1 indicates the center of the machine of which the left side is drawn only, the right-hand side being indicated in spots by broken lines.

Referring to the drawings, layers of cord are arranged upon drums 2, 2 which are symmetrically disposed on opposite sides of the core 5 to produce the endless cord band 1. The drums 2, 2 are secured to gear wheels 3 by means of the guide rods 4 and, together with the bearing 3a and the shaft 3b, are movable in the direction of the arrows A from the center of the machine into the position shown in Fig. 1, so that the endlessly formed cord band 1 may fall with its edges 1a, 1a into the open tongs 7 uniformly arranged at the inner edges of the drums 2, 2 and is equidistantly gripped by the tongs 7.

Each pair of tongs 7 is carried by a lever 8 which is articulated at 9 to a guide rod 12 screwed at 10 to the gear body 11, while the guide ring 13, under the action of the spring 12a, rests against the stops 15d. The levers 8 with their respective tongs, guide rods, etc. are equidistantly disposed on the inside of the wheel body 11 around the main machine shaft 3b in such a way that the levers form a sort of basketlike structure. For the sake of clearness Fig. 1 shows only two lever systems.

The non-rotating main shaft 3b carries the longitudinally immovable slotted guide basket 14 for the tongs, in which the correspondingly slotted guide ring 15 for the lever arms 16, Figs. 1 and 4–6, of the tongs 7 is rotatably arranged. By means of the disc 16a the ring 15 is rotatably arranged in the guide basket 14 so that the disc 16a engages behind the inner projection 18 and is supported by the flange 17 of the hub of the basket 14. In the guide ring 15 a slotted boss 15a is inserted to serve as additional guide and stop for the lever arms 16.

The jaws of the tongs 7 have their fulcrum at 8a on the levers 8. The free ends of the jaws each carry one of the gripper rings 19 and 20, preferably made of rubber, which hold the band 1 firmly in the tongs and urge the tongs to closed position. The elastic rings 19, 20 tend constantly to draw the tongs 7 and the edges of the band 1 towards the center of the machine and around the core 5 and thus, according to the invention, replace the inaccurate and difficult hand work hitherto required for curving.

As shown in the drawings, owing to the slotting of the guide basket 14, bars or segments 14a are formed which are arranged side by side and together constitute the guide head for the core 5, corresponding to the tire profile. The individual bars 14a have the curve profile 14b on which the tension rings 19, 20 are supported during their sliding motion for positively guiding the tongs 7 to draw the band 1 about the core 5.

The tongs move as follows:

The outer ring 19 and the inner ring 20, which embrace the faces of the tongs 7 which are disposed in a circle around the guide head 14, urge the tongs to closed position and to draw them between the bars 14a of the guide member 14, which are curved corresponding to the profile of the core 5. The band 1 is positively guided and controlled by the lever arms 16 of the tongs 7, which swing between the bars 14a in the slots of the guide 14 and determine the opening and closing of the tongs. When the guide ring 15 is turned relative to the guide 14 by means of the segment 22 positioned in the bearings 21, 21 and acts on the boss member 17, the lever arms 16 cannot enter the slots 15b of the guide ring 15 and boss 15a but must rest on the ribs 15c against the tensioning effect of the rubber ring 19 and keep the tongs open to receive the work, as indicated in Fig. 4.

The toothed segment 22 is in mesh with the segment 22a and its oscillatory motion for adjusting the members 15a, 15b relative to the guide head 14 is controlled by the stop lever 23 which strikes the cams 25, 25 on the spindle 24 which during operation is reciprocated with the members 2, 3, 3a, 3b, and 11 in the direction of the longitudinal axis of the machine relative to the core 5, whereas the members 14, 15 with their respective parts are not displaced on the shaft.

In the position shown in Fig. 4 the lever arms 16 are supported by the ribs 15c and the sides of the tongs 7 press against the edge of the drum 2. The rubber band 20 acts against the lever arms 16 so as to cause the tongs to be open for the reception of the work. If the guide ring 15 is adjusted by means of the segment 22 and the cams 25 relative to the positions of the guide head 14, the lever arms 16, under the action of the rubber member 20, will quickly move between the ribs 15b and the tongs will grip the work and close up instantly while, simultaneously, the lever systems are displaced towards the core 5, as indicated in Fig. 5. The rings 19 and 20 then cause the tongs 7 holding the edges of the cord band 1 to slide down on the curves 14b of the bars 14a while the lever systems are moved farther towards the core 5 until the end position according to Fig. 6 has been reached. The cord band 1 is now uniformly drawn around the core 5, and this operation is completed.

The tension ring 19 has an incline 19a for accommodating a wire ring to be inserted in the angle 26 of the tire flange. To carry out the operation required the tongs 7 are correspondingly withdrawn and guided again towards the core 5 to press with the aid of the closed rings 19, 20 the tire flange against the core.

We claim:—

1. In a device for the purpose set forth, a core, a pair of drums movable into and out of juxtaposition to the sides of said core and adapted to have a cord fabric disposed thereon, pairs of gripping jaws disposed in spaced relation about each drum, and means to actuate said jaws to grip on the edges of the cord fabric and draw the fabric into close relation to the core.

2. In a device for the purpose set forth, a core, a pair of drums movable into and out of juxtaposition to the sides of said core and adapted to have a cord fabric disposed thereon, pairs of gripping jaws disposed in spaced relation about each drum, means to actuate said jaws to grip on the edges of the cord fabric and draw the fabric into close relation to the core, and means constantly urging said pairs of jaws to closed positions.

3. In a device for the purpose set forth, a core, a pair of drums movable into and out of juxtaposition to the sides of said core and adapted to have a cord fabric disposed thereon, pairs of gripping jaws disposed in spaced relation about each drum, means to actuate said jaws to grip on the edges of the cord fabric and draw the fabric into close relation to the core, and means to guide said jaws along radial paths having a common center.

4. In a device for the purpose set forth, a core, a pair of drums movable into and out of juxtaposition to the sides of said core and adapted to have a cord fabric disposed thereon, pairs of gripping jaws disposed in spaced relation about each drum, means to actuate said jaws to grip on the edges of the cord fabric and draw the fabric into close relation to the core, means constantly urging said pairs of jaws to closed positions, and means to guide said jaws along radial paths having a common center.

5. In a device for the purpose set forth, a core, a pair of drums movable into and out of juxtaposition to the sides of said core and adapted to have a cord fabric disposed thereon, pairs of gripping jaws disposed in spaced relation about each drum, means to actuate said jaws to grip on the edges of the cord fabric and draw the fabric into close relation to the core, means constantly urging said pairs of jaws to closed positions, and other means adjustable to hold said jaws in opened positions.

6. In a device for the purpose set forth, a core, a pair of drums movable into and out of juxtaposition to the sides of said core and adapted to have a cord fabric disposed thereon, pairs of gripping jaws disposed in spaced relation about each drum, means to actuate said jaws to grip on the edges of the cord fabric and draw the fabric into close relation to the core, means to guide said jaws along radial paths having a common center, and other means adjustable to hold said jaws in opened positions.

LEONHARD HERBERT.
ADOLF FRÖHLICH.